United States Patent
Granshaw et al.

(10) Patent No.: US 9,674,069 B2
(45) Date of Patent: Jun. 6, 2017

(54) WORKLOAD MANAGEMENT

(71) Applicant: International Business Machines Corporation, Armonk, NY (US)

(72) Inventors: David Granshaw, Eastleigh (GB); Samuel T. Massey, Winchester (GB); Daniel J. McGinnes, Southampton (GB); Martin A. Ross, Gosport (GB); Richard G. Schofield, Eastleigh (GB); Craig H. Stirling, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 14/507,960

(22) Filed: Oct. 7, 2014

(65) Prior Publication Data

US 2015/0163122 A1    Jun. 11, 2015

(30) Foreign Application Priority Data

Dec. 5, 2013  (GB) .................................. 1321477.0

(51) Int. Cl.
*G06F 15/173*  (2006.01)
*H04L 12/26*   (2006.01)
*H04L 12/58*   (2006.01)

(52) U.S. Cl.
CPC .............. *H04L 43/16* (2013.01); *H04L 51/06* (2013.01); *H04L 43/0817* (2013.01); *H04L 43/0876* (2013.01)

(58) Field of Classification Search
CPC ....... H04Q 3/0091; H04L 69/04; H04L 51/06; H04L 43/16; G06F 3/0671
USPC ........... 370/230; 719/313; 711/152; 709/224
See application file for complete search history.

(56) References Cited

U.S. PATENT DOCUMENTS

| | | | |
|---|---|---|---|
| 5,506,966 A | 4/1996 | Ban | |
| 5,604,869 A | 2/1997 | Mincher et al. | |
| 5,617,541 A | 4/1997 | Albanese et al. | |
| 5,940,390 A | 8/1999 | Berl et al. | |

(Continued)

FOREIGN PATENT DOCUMENTS

| CN | 102301370 A | 12/2011 |
|---|---|---|
| GB | 2479651 A | 10/2011 |

(Continued)

OTHER PUBLICATIONS

List of IBM patents or Patent Applications Treated as Related (Appendix P), 2 pages.

(Continued)

*Primary Examiner* — Dustin Nguyen
(74) *Attorney, Agent, or Firm* — Nicholas D. Bowman

(57) ABSTRACT

A messaging system comprises a plurality of connected components and including a schema defining fields for messages, at least one field defined as non-essential. A mechanism for operating the messaging system comprises the steps of collecting one or more performance metrics for one or more components of the messaging system, determining that at least one performance metric has crossed a predetermined threshold, informing one or more components of the messaging system that a surge in workload has occurred, and the informed components removing non-essential fields from transmitted messages and/or not processing non-essential fields from received messages.

17 Claims, 6 Drawing Sheets

(56) References Cited

U.S. PATENT DOCUMENTS

| | | | |
|---|---|---|---|
| 6,650,619 B1* | 11/2003 | Schuster | H04Q 3/0091 370/230 |
| 6,847,989 B1 | 1/2005 | Chastain et al. | |
| 6,950,825 B2 | 9/2005 | Chang et al. | |
| 7,039,671 B2 | 5/2006 | Cullen | |
| 7,448,043 B2* | 11/2008 | Shenfield | H04L 69/04 719/313 |
| 7,657,501 B1 | 2/2010 | Brown et al. | |
| 7,698,369 B2 | 4/2010 | Addante et al. | |
| 7,716,525 B1 | 5/2010 | Buchko et al. | |
| 8,144,714 B1 | 3/2012 | Buchko et al. | |
| 8,146,095 B2 | 3/2012 | Gale et al. | |
| 8,346,909 B2 | 1/2013 | Dan et al. | |
| 8,370,847 B2 | 2/2013 | Bedi et al. | |
| 8,386,995 B2 | 2/2013 | Coleman et al. | |
| 8,775,519 B2 | 7/2014 | Smith et al. | |
| 8,825,964 B1* | 9/2014 | Sopka | G06F 3/0671 711/152 |
| 2003/0188021 A1 | 10/2003 | Challenger et al. | |
| 2006/0101089 A1 | 5/2006 | Parr et al. | |
| 2007/0038744 A1 | 2/2007 | Cocks et al. | |
| 2007/0064703 A1 | 3/2007 | Hernandez et al. | |
| 2007/0079379 A1 | 4/2007 | Sprosts et al. | |
| 2007/0156833 A1 | 7/2007 | Nikolov et al. | |
| 2007/0283194 A1 | 12/2007 | Villella et al. | |
| 2008/0127208 A1 | 5/2008 | Bedi et al. | |
| 2008/0133541 A1 | 6/2008 | Fletcher et al. | |
| 2010/0017441 A1 | 1/2010 | Todd | |
| 2012/0131108 A1 | 5/2012 | Barsness et al. | |
| 2012/0265881 A1 | 10/2012 | Chen et al. | |
| 2012/0317249 A1 | 12/2012 | Salsburg et al. | |
| 2012/0331030 A1 | 12/2012 | Banks et al. | |
| 2013/0024492 A1 | 1/2013 | Graff et al. | |
| 2013/0039176 A1 | 2/2013 | Kanode et al. | |
| 2013/0060834 A1 | 3/2013 | Paramasivam et al. | |
| 2013/0103842 A1 | 4/2013 | Seed et al. | |
| 2013/0117238 A1 | 5/2013 | Gower | |
| 2016/0127300 A1 | 5/2016 | Granshaw et al. | |

FOREIGN PATENT DOCUMENTS

| | | |
|---|---|---|
| GB | 2479651 A | 10/2011 |
| WO | 0057606 A1 | 9/2000 |
| WO | WO00/57606 A1 | 9/2000 |
| WO | 2015083044 A1 | 6/2015 |

OTHER PUBLICATIONS

Search Report under Section 17(5) dated May 27, 2014, International Application No. A G81321477.0, 3 pages.

Blagodurov, Sergey et al., "Maximizing Server Utilization while Meeting Critical an SLAs via Weight-Based Collocation Management", 2013 IFIP/IEEE International Symposium on Integrated Network Management (IM 2013), May 27-31, 2013, 9 pages.

Garg, Saurabh K. et al., "SLA-Based Resource Provisioning for Heterogeneous Workloads in a Virtualized Cloud Datacenter", ICA3PP'11 Proceedings of the 11th International Conference on Algorithms and Architectures for Parallel Processing, Oct. 24-26, 2011, 14 pages.

IBM, "IBM Integration Bus V9.0 Delivers Key Enhancements to Enable Intelligent Processing and Operational Management Within an Integration Solution", IBM United States Software Announcement 213-133, dated Apr. 23, 2013, 25 pages.

IBM, What's new in Version 9.0?, IBM Integration Bus Version 9.0.0.0 Product Overview, Copyright IBM Corporation 1999, 2013. Last updated Jul. 1, 2013, 4 pages.

PCT Notification of Transmittal of the International Search Report and the Written Opinion of the International Searching Authority, or the Declaration (PCT/ISA/220), the International Search Report (PCT/ISA/220) and the Written Opinion of the International Searching Authority (PCT/ISA/237), International Application No. PCT/IB2014/066357 dated Apr. 1, 2015, 11 pages.

GB Application 1321477.0, Entitled "Workload Management," Filed Dec. 5, 2013, 25 pages.

IBM, "Meta-data of message control information," An IP.com Prior Art Database Technical Disclosure, Original Publication Date: Sep. 24, 2004, IP.com No. 000031415, 3 pages.

Unknown, "Data Format Description Language (DFDL)," Open Grid Forum—Open Forum | Open Standards, 9 pages, https://www.ogf.org/ogf/doku.php/standards/dfdl/dfdl.

Granshaw et al., "Dynamic Granular Messaging Persistence," U.S. Appl. No. 13/688,378, filed Nov. 29, 2012, 21 pages.

IBM, "Service integration bus configuration for the Web messaging service," IBM Knowledge Center, WebSphere Application Server Network Deployment 6.1.0, Feature Pack for Web 2.0, Version 1.0.1, 8 pages.

Morag Hughson et al "Final MQ and Message Broker Performance Boot camp: WebSphere MQ & Message Broker", IBM Hursley, Mar. 3, 2011, 95 pages.

Aleksandar Lazarevic "Probabilistic Grid Scheduling Based on Job Statistics and Monitoring Information", University College London, London, England 2005, 101 pages.

Search Report under Section 17(5) dated May 27, 2014, International Application No. GB1321477.0, 3 pages.

Blagodurov et al., "Maximizing Server Utilization while Meeting Critical SLAs via Weight-Based Collocation Management", 2013 IFIP/IEEE International Symposium on Integrated Network Management (IM 2013), May 27-31, 2013, 9 pages.

Garg et al., "SLA-Based Resource Provisioning for Heterogeneous Workloads in a Virtualized Cloud Datacenter", ICA3PP'11 Proceedings of the 11th International Conference on Algorithms and Architectures for Parallel Processing, Oct. 24-26, 2011, 14 pages.

IBM, "What's new in Version 9.0?", IBM Integration Bus Version 9.0.0.0 Product Overview, Copyright IBM Corporation 1999, 2013, last updated Jul. 1, 2013, 4 pages.

List of IBM Patents or Patent Applications Treated as Related, Jan. 11, 2016, 2 pages.

IBM, List of IBM Patents or Patent Applications Treated as Related, Nov. 29, 2016, 2 pages.

* cited by examiner

WORKLOAD MANAGEMENT

BACKGROUND

This invention relates to mechanisms for operating a messaging system and to a messaging system itself. In a preferred embodiment, the invention provides a schema based approach to workload management.

One of the key problems facing many businesses that use computing systems is the ability to manage surges in workload. To manage this problem, businesses have the choice of either employing significant amounts of redundant hardware and software to cope with the peak workload, which has the disadvantage that the business is then paying for hardware and software which may be redundant for the majority of time, or use a cloud-based solution from an external provider. For many businesses, the use of the external cloud based approach is unacceptable because they would lose direct control of data and security boundaries. If a business fails to manage a surge in workload successfully the result can be bad publicity, a fall in consumer confidence and a loss in revenue.

SUMMARY

According to an illustrative embodiment, there is provided a method of operating a messaging system, the messaging system comprising a plurality of connected components and including a schema defining fields for messages, at least one field defined as non-essential, the method comprising collecting one or more performance metrics for one or more components of the messaging system, determining that at least one performance metric has crossed a predetermined threshold, informing one or more components of the messaging system that a surge in workload has occurred, and the informed components removing non-essential fields from transmitted messages and/or not processing non-essential fields from received messages.

According to another illustrative embodiment, there is provided a messaging system comprising a plurality of connected components and including a schema defining fields for messages, at least one field defined as non-essential, one component of the messaging system comprising a schema controller arranged to collect one or more performance metrics for one or more components of the messaging system, determine that at least one performance metric has crossed a predetermined threshold, inform one or more components of the messaging system that a surge in workload has occurred, and wherein the informed components are arranged to remove non-essential fields from transmitted messages and/or not process non-essential fields from received messages.

According to another illustrative embodiment, there is provided a computer program product on a computer readable medium for operating a messaging system, the messaging system comprising a plurality of connected components and including a schema defining fields for messages, at least one field defined as non-essential, the product comprising instructions for collecting one or more performance metrics for one or more components of the messaging system, determining that at least one performance metric has crossed a predetermined threshold, informing one or more components of the messaging system that a surge in workload has occurred, and the informed components removing non-essential fields from transmitted messages and/or not processing non-essential fields from received messages.

BRIEF DESCRIPTION OF THE DRAWINGS

Embodiments of the invention will now be described, by way of example only, with reference to the following drawings, in which.

DETAILED DESCRIPTION

Figure 1:
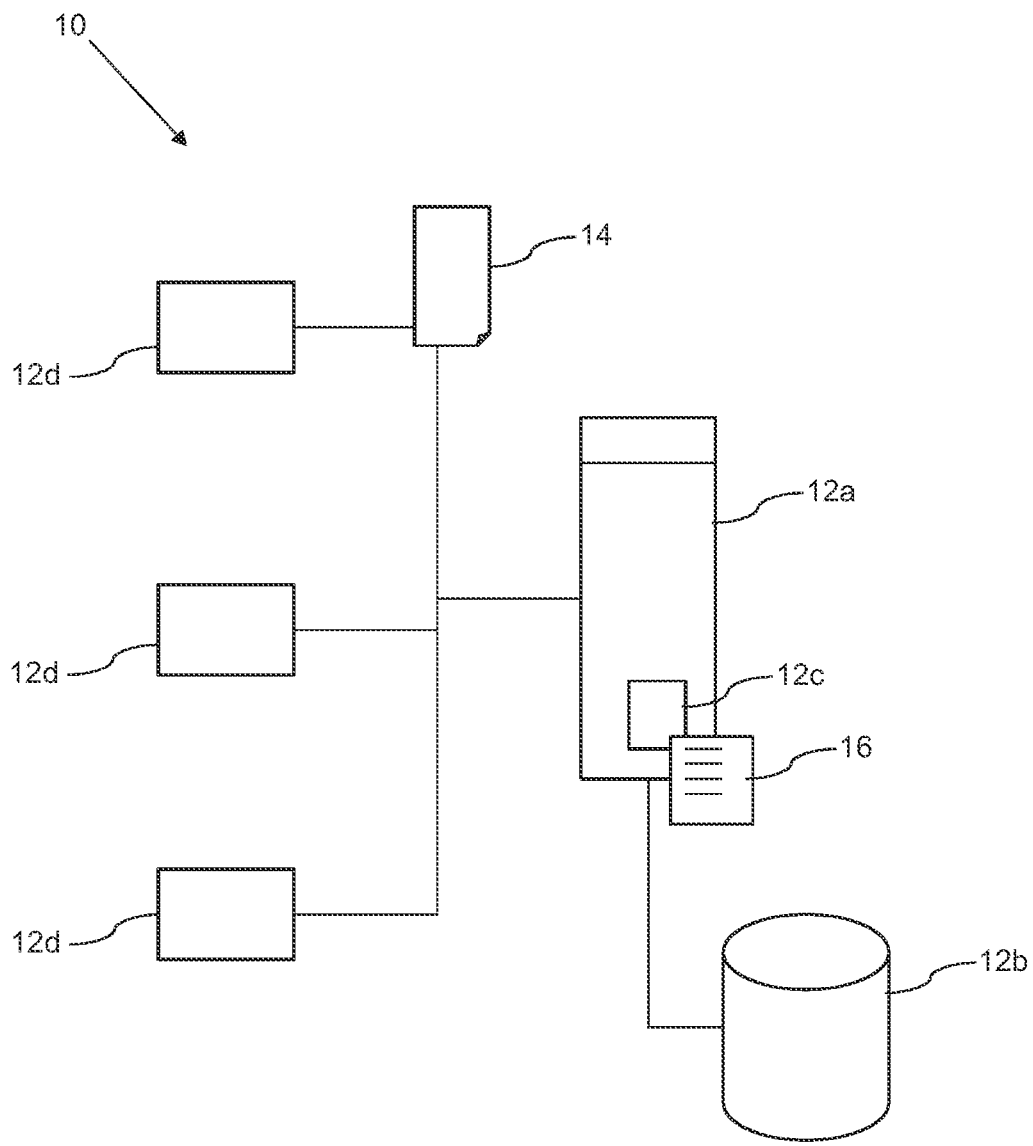
FIG. 1 is a schematic diagram of a messaging system.

In accordance with the illustrative embodiments, it is possible to reduce the workload within a messaging system, when surges in workload occur, using a schema based processing technique that is managed, for example, by a schema controller. When an unsustainable surge in workload occurs, which is detected by monitoring the underlying system resources, the schema controller will inform the relevant components within the system to alter their interpretation of key schema entries. This allows non-essential elements to be discarded or processed differently when the system is under pressure, for example, by not serialising (or even removing) non-essential blocks of data. Essential data is always processed.

The methodology focusses on an entire enterprise system, preferably using multiple levels of control across disparate processing systems to ensure the overall system can cope with peak workloads as well as unexpected surges in data. The methodology reduces the amount of redundant hardware required to meet the requisite system performance criteria, In an illustrative embodiment, the schema controller may target specific parts of the processing within the overall system, for example removing elements that are serialised across the network when network utilisation is high. When the workload returns within acceptable limits, all fields will be processed as before.

Thus, in cases where messaging systems are dealing with a mixture of essential and non-essential data, businesses can seamlessly process all data whenever possible but process a reduced set automatically when required. The amount of hardware required to cope with surges in workload is therefore reduced. If an unexpectedly high workload is encountered then, compared to current technology, the modified system is more likely to cope. This reduces the risk of lost consumer confidence and the potential loss of revenue, The methodology is preferably implemented by introducing a schema controller and new schema augmentations. The schema controller monitors performance metrics such as CPU, disk and network utilisation. The new schema augmentations will be interpreted by a system component depending upon the latest information provided by the schema controller.

Examples of a new schema augmentation may include: a field marked as "processAlways", which means that the associated field must always be processed, a field marked as "processLevel1", which may be dropped during initial parsing, transformation or serialisation across the network when the "level1" constraints are reached (for example CPU >55%), a field marked as "processLevel2", which may be dropped during initial parsing, transformation or serialisation across the network when the "level2" constraints are reached. (for example CPU >90%) and a field marked as "processSerialisation", which may be dropped only when serialising across the network, which allows for cases where data integrity would be compromised if fields were removed at other points in the processing.

FIG. 1 illustrates a messaging system 10, which is comprised of a plurality of connected components 12. The components 12 of the messaging system can be either hardware and/or software components 12 which are connected together over one or more networks. The networks will often include a fixed line (broadband telephony and/or Ethernet) network and/or one or more wireless networks such as a broadband wireless (3G) network. Components within the system 10 may be stationary or mobile. A typical simple network, as shown in the Figure, comprises a server 12a that is connected to a database 12b. The server 12a is running a messaging application 12c, which communicates with multiple mobile units 12d.

The messaging system 10 will operate by the transmission and receipt of messages 14 to and from the components 12 within the system 10. A message 14 is essentially a communication that is configured in a predetermined fashion, so that all of the components 12 within the system 10 can structure their messages 14 accordingly and can understand messages 14 that are received from other components 12. The system 10 includes a schema 16, which defines fields for the messages 14. The schema 16 could be an extensible markup language (XML) document that defines the fields and their characteristics for the messages 14. The schema 16 is here stored by the messaging application 12c.

The schema 16 can be accessed by all of the components 12 within the system 10, who generally will have access to their own local copy of the schema 16. At least one field within the schema 16 is defined as non-essential. This definition can be apparent in either a positive or negative sense, as fields could either be marked directly as essential (in which case all other fields are defined as non-essential) or fields could be marked directly as non-essential (and by inference all other fields are essential). Non-essential fields could be graded according to importance, using a hierarchy of levels to define the relative importance of non-essential fields.

Figure 2:
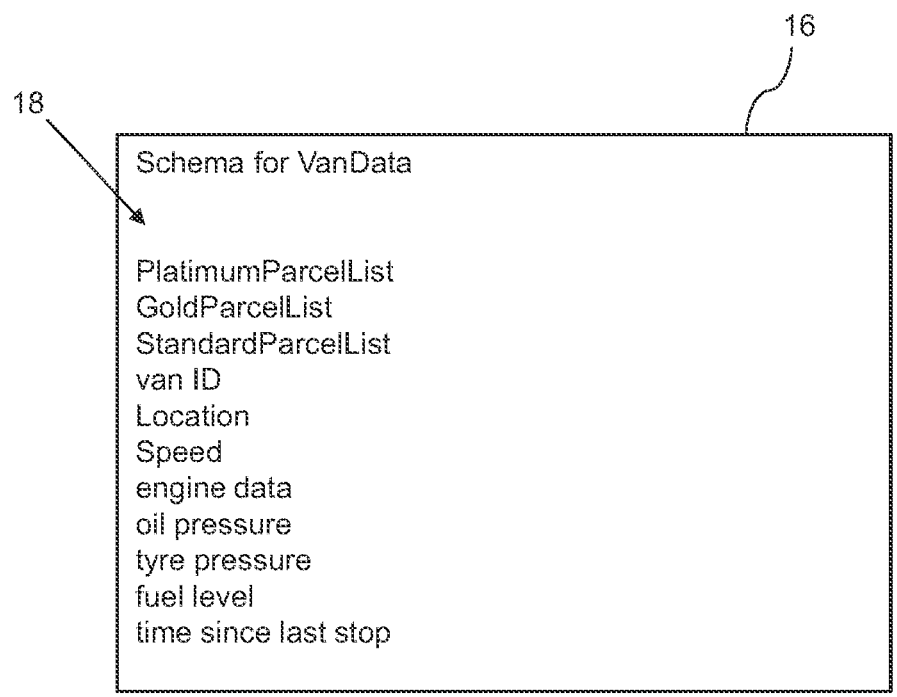
FIG. 2 is a schematic diagram of a message schema.

FIG. 2 shows a representation of a schema 16 composed of fields 18, which relates to a messaging system 10 (shown in FIG. 3) operated by a parcel delivery business in this example, it is assumed that the parcel delivery company wishes to track the parcels and registered mail that it delivers. Every five minutes each parcel van 12d, of which there may be many thousands, could transmit a "VanData" message containing the following fields: PlatimumParcelList, GoldParcelList, StandardParcelList, van ID, location, speed, engine data, oil pressure, tire pressure, fuel level and time since last stop. This data will be parcelled up into a message 14 using the structure that is defined by the schema 16. Each message 14 will be created by a hardware component fitted to each of the company's vans.

The PlatinumParcelList is a list of all parcels on a van that have paid for a platinum level of service. This level of service guarantees that the sender will know the location of the parcel every five minutes, The GoldParcelList is a list of parcels where the quality of service guarantees that the sender will know the location of the parcel as often as possible, but definitely at least every four hours. The StandardParcelList has a list of parcels where the quality of service is not guaranteed and information will be provided wherever possible. These levels of service are given as examples to illustrate the nature of the schema and how it will be handled within a messaging system.

All the VanData is received at a central processing site. When a parcel is added to a van it will be added to the van's Platinum, Gold or Standard parcel list, depending upon the quality of service for which the customer has paid. Similarly it will be removed from the list when it is delivered (to a sorting office or to the end customer). In this way, the continuous stream of messages from each van allows the central processing site to track all of the packages that are currently in transit and also provide the information to users, for example via an external website that will allow users to enter a tracking number for their parcel.

Figure 3:
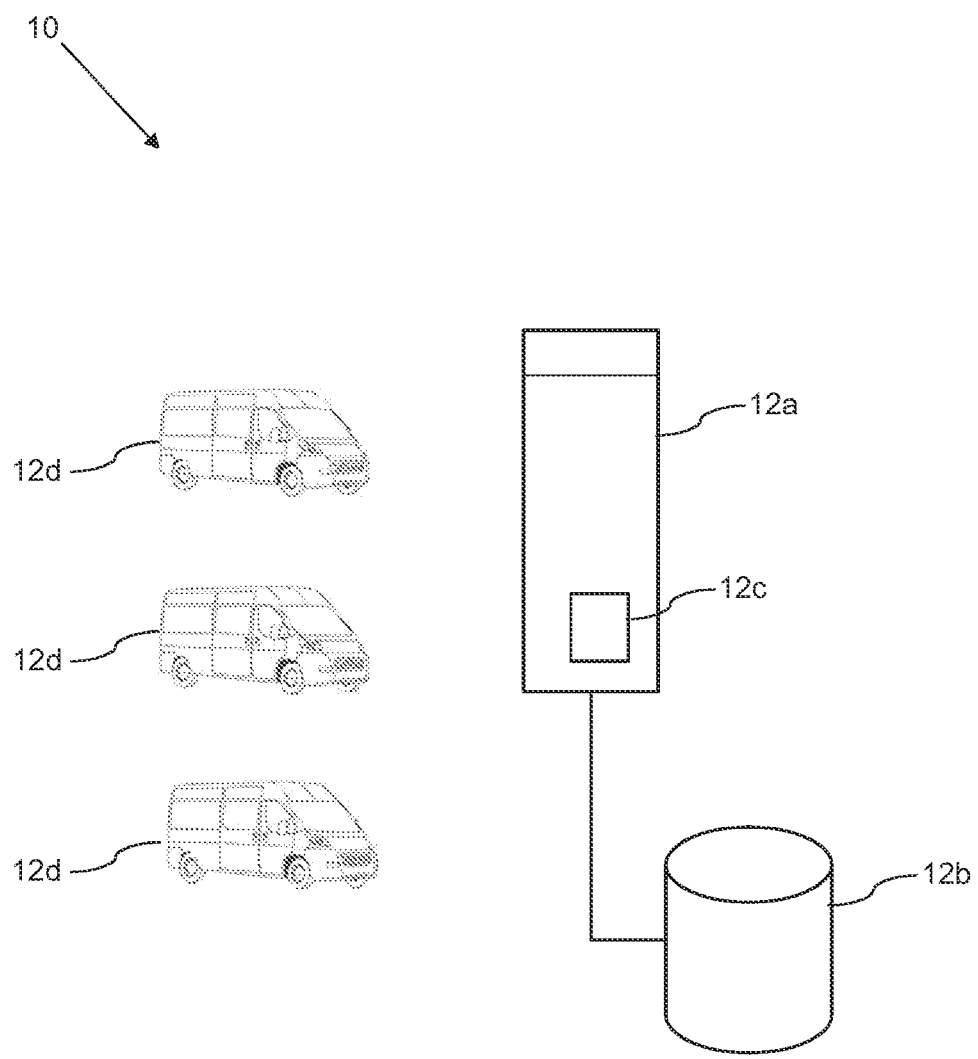
FIG. 3 is a schematic diagram of a messaging system in accordance with an illustrative embodiment.

The problem with messaging system 10 of FIG. 3 of the parcel delivery business is the fact that the central processing site 12 a needs to be sized to handle the peak workload., i.e., to handle the processing of all of the parcels in the period leading up to Christmas. This results in heavily under-utilised hardware for the rest of the year. Using the improved system, however, a number of fields of the schema are marked to allow them to be processed differently when the system 10 is under an unsustainable load. This reduces the amount of redundant hardware required by the messaging system. Essentially, the messaging system is configured to identify that a surge in workload has occurred and can respond accordingly.

For example, the PlatinumParcelList customers have paid extra to have complete knowledge of their parcel's location; this data must always be processed. The GoldParcelList needs to be processed as often as possible, but at least every four hours; this data would only be reduced if severe resource shortages occurred (for example CPU >90%, network >90%). Finally, the StandardParcethist has no service level agreement; this data would be reduced if the resources were under any pressure due to a surge in workload (for example CPU >55%). The remaining VanData fields must always be processed. Performance metrics are measured for one or more components 12 of the messaging system 10 and used to judge if the messaging system 10 is under load.

Avoiding the processing of the StandardParcelList would save the processing of many millions of messages for parcels and therefore the amount of redundant hardware could be significantly reduced. When there was no surge in workload, the system 10 would process all fields in the messages as usual. This provides a high level and rich source of information for the majority of the year for the management of the van company and the customers. The amount of data would be automatically reduced when the system was overloaded, while still meeting service level agreements. Fields that are non-essential are either dropped from messages 14 and/or are not processed by the components 12 within the system 10.

Figure 4:
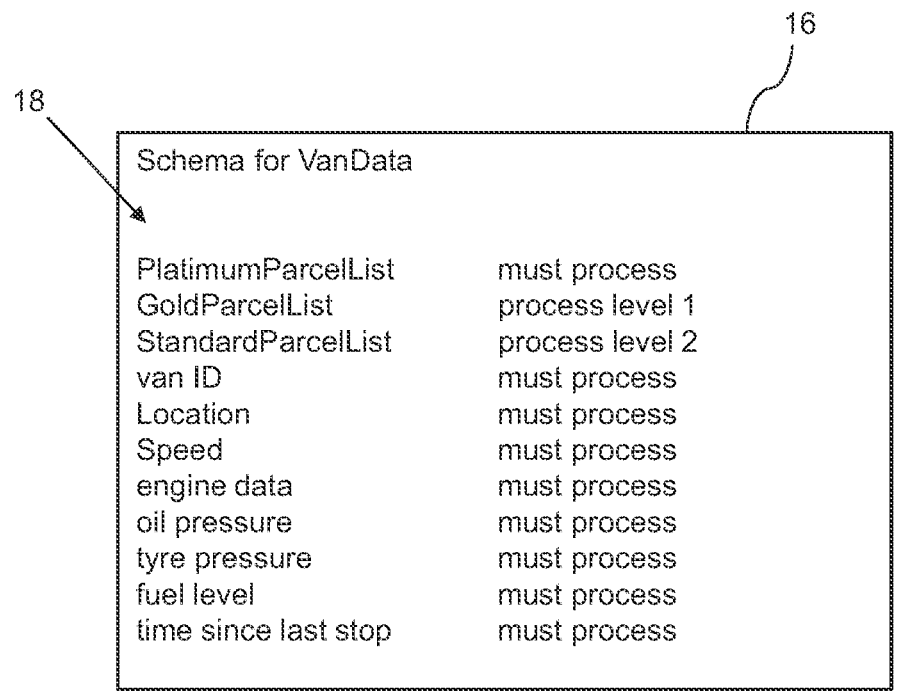
FIG. 4 is a schematic diagram of an amended message schema in accordance with an illustrative embodiment.

In terms of the amended schema 12, show in FIG. 4, this example could be written as:

```
<xs:schema xmlns:msg=http://www.ibm.com/mpt/process/
    xmlns:xsd="http://www.w3.org/2001/XMLSchema" ...>
    <xsd:complexType name="VanData">
        <xsd:sequence>
            <xsd:element name="VanID" type="xsd:string"
                processing="msg:mustProcess"/>
```

```
          <xsd:element name="location" type="xsd:string"
            processing="msg:mustProcess"/>
          <xsd:element name="PlatinumParcelList"
  type="xsd:string" processing="msg:mustProcess"/>
          <xsd:element name="GoldParcelList"
  type="xsd:string" processing="msg:processLevel1"/>
          <xsd:element name="StandardParcelList"
  type="xsd:string" processing="msg:processLevel2"/>
          ......
        </xsd:sequence>
      </xsd:complexType>
```

This adapted schema 16 includes an additional qualification for each field of the schema, which in this example is one of three different qualifiers: "mustProcess", "processLevel1" or "processLevel2". All those fields that are marked with either "processLevel1" or "processLevel2" are defined as non-essential and can be dispensed with if the messaging system 10 is approaching overload. The simplest form of system adaption is that these non-essential fields are dropped from the messages 14 before they are transmitted. This reduces the amount of data that has to be transmitted between components 12 of the messaging system 10 and also reduces the amount of data that has to be processed by software components within the messaging system 10

The non-essential fields 18 of the messages 14 are arranged in a hierarchy, in order to provide flexibility for the handling of the non-essential fields. Depending upon the level of the perceived system overload, some non-essential fields could still be kept while only the lowest level of non-essential fields are discarded. In this example, the first fields to be dropped would be the "processLevel2" fields, which can be discarded first, for example when overload is first detected. If the overload continues to worsen, then the "processLevel I" fields can also be discarded, in order to further reduce the demands on the messaging system, Multiple additional levels can be used, the design of the schema supports any level of granularity.

Figure 5:
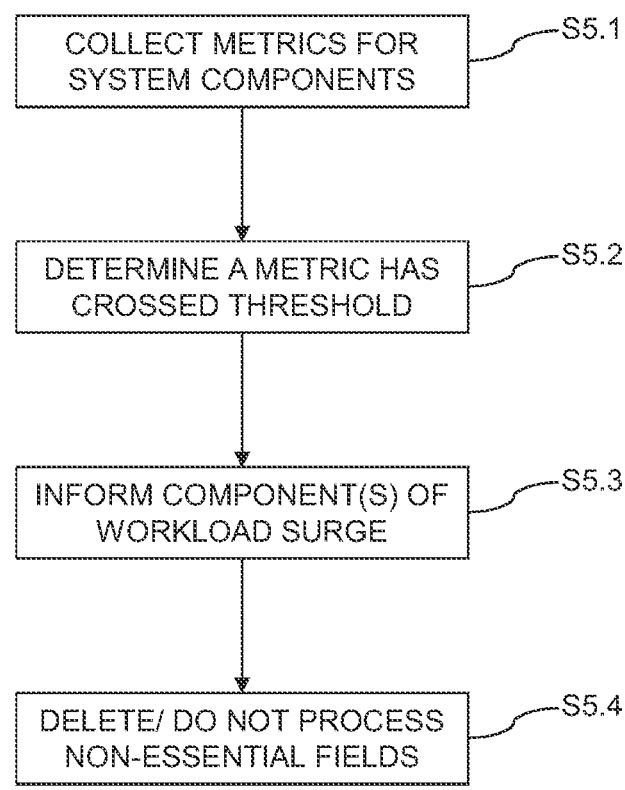
FIG. 5 is a flowchart of operating the messaging system in accordance with illustrative embodiment.

FIG. 5 shows a flowchart of the operating the messaging system 10. As discussed above, the messaging system 10 comprises a plurality of connected components 12 and including a schema 16 defining fields 18 for messages 14, at least one field 18 defined as non-essential. The schema 16 is available to all of the components 12 within the messaging system 10. The method comprises, firstly, step S5.1, which comprises collecting one or more performance metrics for one or more components of the messaging system 10. The performance metrics of the components 12 of the messaging system 10 that are collected comprise processor utilisation, network utilisation and/or storage utilisation, Next is step S5.2, which comprises determining that at least one performance metric has crossed a predetermined threshold. Preferably a central component such as a schema controller is monitoring various performance metrics in the messaging system 10 relative to at least one predefined threshold. For example, a specific central processing component may be considered system critical and will have its CPU utilisation monitored as a percentage. When this percentage crosses 70% (for example) then this can be used as an indicator that the messaging system 10 is in overload and action needs to be taken to prevent either system failure or an unacceptable drop in the service level.

The third step is step S5.3, which comprises informing one or more components 12 of the messaging system 10 that a surge in workload has occurred, and in response, in step S5.4, the informed components remove non-essential fields from transmitted messages and/or do not process non-essential fields from received messages. Once workload overload is detected, then the schema controller will notify components 12 within the messaging system 10 that a surge in workload has been detected. Not all components 12 are necessarily notified, this will depend on the configuration of the system 10. Only those components 12 generating a high proportion of the messages 14 may be notified, for example.

Figure 6:
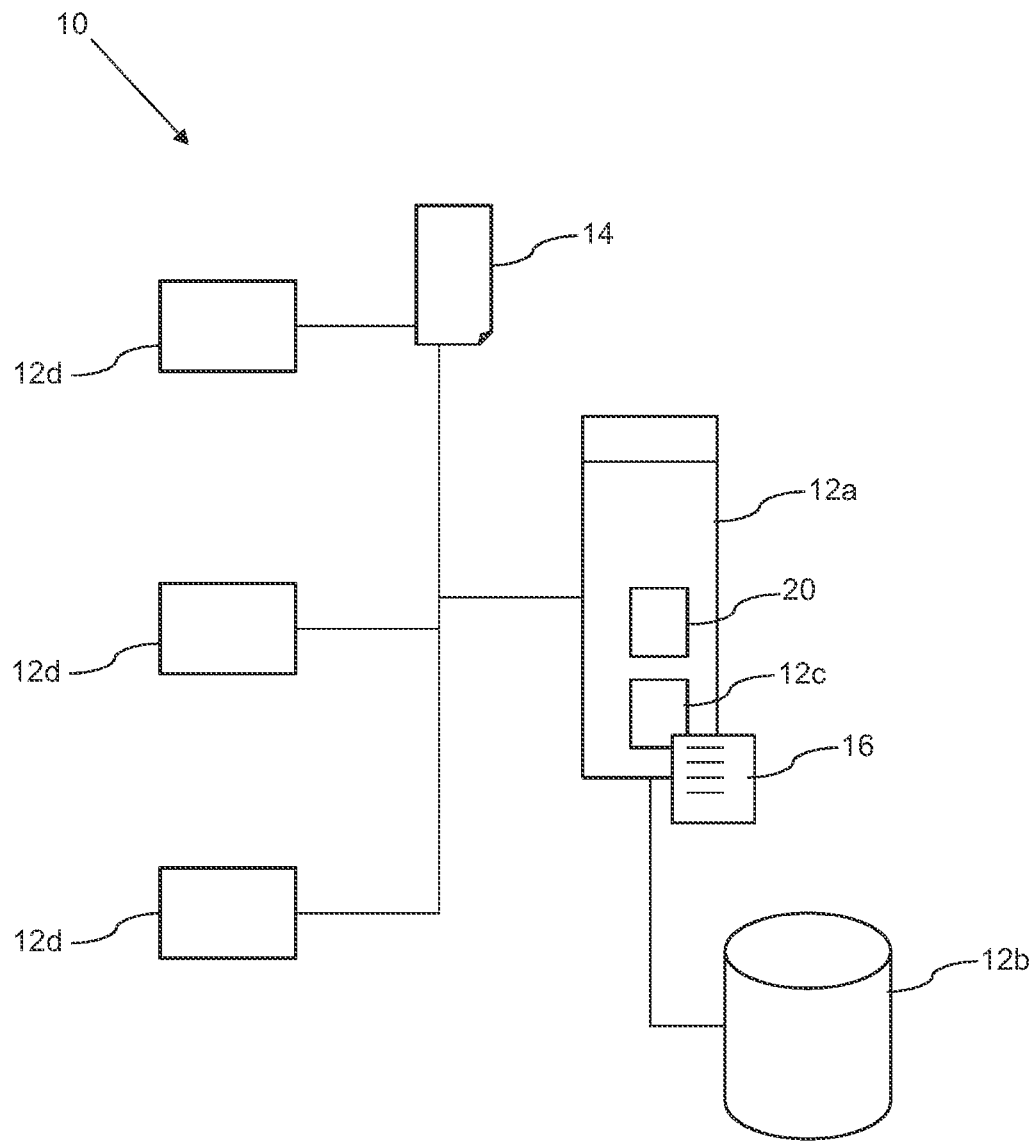
FIG. 6 is a schematic diagram of a messaging system with a schema controller in accordance with an illustrative embodiment.

FIG. 6 shows an embodiment of a messaging system 10 that includes a schema controller 20. The operation of the schema controller 20 offers a generalised way for messaging systems with a mixture of essential and non-essential data to cope with surges in workload, without the need for large amounts of redundant hardware and with a reduced risk that the messaging system will become overloaded. For the majority of the time there will be no surge in workload so all available data will be processed and the business sees no impact. Essential data will always be processed. The parsing, processing and network serialisation can be changed, for non-essential data, based on the schema 16, to cope with surges in workload.

The schema controller 20 will continue to monitor the performance metrics of the messaging system 10 and will determine that the performance metric that had crossed the predetermined threshold has re-crossed the threshold and inform the components 12 of the messaging system 10 that the slime in workload is over, The schema controller 20 effectively performs continuous monitoring of the performance metrics and when the metrics return to normal the schema controller 20 will inform the components 12 of the messaging system 10 that the workload is no longer at a critical level. This will result in the components 12 of the messaging system 10 restoring those non-essential fields 18 that have been dropped to messages 14.

In the illustrative embodiment of the improved messaging system 10, the fields 18 that are defined as non-essential are graded according to importance. This means that multiple predetermined thresholds are used with respect to the monitored performance metrics, in order that different levels of overload can be identified. The schema controller 20, when informing components 12 of the messaging system 10 that a surge in workload has occurred, also informs the components 12 of the messaging system 10 of the level of slime in workload. This allows the individual components 12 of the messaging system 10 to adapt their operation accordingly. The indicated level of overload will determine which fields are dropped and/or not processed.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), compact disc read/write (CD-R/W) or DVD disc, an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. , or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages (Java and all Java-based trademarks and logos are trademarks or registered trademarks of Oracle and/or its affiliates; other marks may be trademarks or registered trademarks of their respective owners). The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated, circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In one alternative, the preferred embodiment of the present invention may be realized in the form of a computer implemented method of deploying a service comprising steps of deploying computer program code operable to, when deployed into a computer infrastructure and executed thereon, cause said computer system to perform all the steps of the method.

In a further alternative, the preferred embodiment of the present invention may be realized in the form of a data carrier having functional data thereon, said functional data comprising functional computer data structures to, when loaded into a computer system and operated upon thereby, enable said computer system to perform all the steps of the method.

Note further that any methods described in the present disclosure may be implemented through the use of a VHDL (VHSIC Hardware Description Language) program and a VHDL chip. VHDL is an exemplary design-entry language for Field Programmable. Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as an FPGA.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be clear to one skilled in the art that many improvements and modifications can be made to the foregoing exemplary embodiment without departing from the scope of the present invention.

The invention claimed is:

1. A method of operating a messaging system, the messaging system comprising a plurality of connected components and including a schema defining fields for messages, at least one field defined as non-essential, the method comprising the steps of:
   collecting one or more performance metrics for one or more components of the messaging system;
   determining that at east one performance metric has crossed a predetermined threshold;
   informing one or more components of the messaging system that a surge in workload has occurred; and
   the informed components removing non-essential fields from transmitted messages and/or not processing non-essential fields from received messages;
   wherein those fields defined as non-essential are graded according to importance, multiple predetermined thresholds are used with respect to the monitored performance metrics, and the step of informing one or more components of the messaging system that a surge in workload has occurred includes informing the one or more components of the messaging system of the level of surge in workload.

2. A method according to claim 1, and further comprising determining that the at least one performance metric that had crossed the predetermined threshold has re-crossed the threshold and informing one or more components of the messaging system that the surge in workload is over.

3. A method according to claim 1, wherein the step of not processing non-essential fields comprises not serialising the non-essential fields of a transmitted message.

4. A method according to claim 1, wherein the performance metrics of the components of the messaging system that are collected comprise processor utilisation, network utilisation and/or storage utilisation.

5. A messaging system, including processor and memory, comprising a plurality of connected components and including a schema defining fields for messages, at least one field defined as non-essential one component of the messaging system comprising a schema controller operating on the processor, the schema controller arranged to:
   collect one or more performance metrics for one or more components of the messaging system;
   determine that at least one performance metric has crossed a predetermined threshold; and inform one or more components of the messaging system that a surge in workload has occurred, and
   wherein the informed components are arranged to remove non-essential fields from transmitted messages and/or not process non-essential fields from received messages;
   wherein those fields defined as non-essential are graded according to importance, multiple predetermined thresholds are used with respect to the monitored performance metrics, and the schema controller is arranged, when informing one or more components of the messaging system that a surge in a workload has occurred, to inform the one or more components of the messaging system of the level of surge in workload.

6. A system according to claim 5, wherein the schema controller is further arranged to determine that the at least one performance metric that had crossed the predetermined threshold has re-crossed the threshold and inform one or more components of the messaging system that the surge in workload is over.

7. A system according to claim 5, wherein the components of the messaging system are arranged, when not processing non-essential fields of messages, to not serialise the non-essential fields of a transmitted message.

8. A system according to claim 5, wherein the performance metrics of the components of the messaging system that are collected comprise processor utilisation, network utilisation and/or storage utilisation.

9. A computer program product on a computer readable medium for operating a messaging system, the messaging system comprising a plurality of connected components and including a schema defining fields for messages, at least one field defined as non-essential, wherein the computer program product is not a transitory signal per se, the product comprising instructions for:
   collecting one or more performance metrics for one or more components of the messaging system;
   determining that at least one performance metric has crossed a predetermined threshold; informing one or more components of the messaging system that a surge in workload has occurred; and
   the informed components removing non-essential fields from transmitted messages and/or not processing non-essential fields from received messages;
   wherein those fields defined as non-essential are graded according to importance, multiple predetermined thresholds are used with respect to the monitored performance metrics, and the instructions for informing one or more components of the messaging system that a surge in workload has occurred include instructions for informing the one or more components of the messaging system of the level of surge in workload.

10. A computer program product according to claim 9, and further comprising instructions for determining that the at least one performance metric that had crossed the predetermined threshold has re-crossed the threshold and informing one or more components of the messaging system that the surge in workload is over.

11. A computer program product according to claim 9, wherein the instructions for not processing non-essential fields from messages comprise instructions for not serialising the non-essential fields of a transmitted message.

12. A computer program product according to claim 9, wherein the performance metrics of the components of the messaging system that are collected comprise processor utilisation, network utilisation and/or storage utilisation.

13. A computer program product according to claim 9, wherein at least one non-essential field removed from a transmitted message and/or at least one non-essential field not processed from a received message includes a data value.

14. A system according to claim 5, wherein at least one non-essential field removed from a transmitted message and/or at least one non-essential field not processed from a received message includes a data value.

15. A method according to claim 1, wherein at least one non-essential field removed from a transmitted message and/or at least one non-essential field not processed from a received message includes a data value.

16. A method according to claim 15, wherein the data value is not syntax.

17. A method according to claim 1, wherein the informed components removing non-essential fields from transmitted messages and/or not processing non-essential fields from received messages comprises:

the informed components removing the non-essential fields from the transmitted messages such that components receiving the transmitted messages are unable to process the entirety of the transmitted messages due to the non-essential fields having been removed.

\* \* \* \* \*